United States Patent [19]

Yananton et al.

[11] Patent Number: 4,840,140
[45] Date of Patent: * Jun. 20, 1989

[54] SECURING MEANS FOR ODORLESS ANIMAL LITTER UNIT

[76] Inventors: Patrick Yananton, 1518 Little Hill Rd., Point Pleasant; Janice P. Parker, 365 St. Nicholas Ave., Haworth, both of N.J. 08742

[ * ] Notice: The portion of the term of this patent subsequent to Feb. 3, 2004 has been disclaimed.

[21] Appl. No.: 948,209

[22] Filed: Dec. 31, 1986

Related U.S. Application Data

[63] Continuation-in-part of Ser. No. 573,958, Jan. 26, 1984, which is a continuation-in-part of Ser. No. 315,307, Oct. 27, 1981, Pat. No. 4,469,046, which is a continuation-in-part of Ser. No. 909,256, May 24, 1978, abandoned.

[51] Int. Cl.[4] .............................................. A01K 67/00
[52] U.S. Cl. ...................................................... 119/1
[58] Field of Search ................ 220/404, 405, 406, 407; 119/1

[56] References Cited

U.S. PATENT DOCUMENTS

| | | | |
|---|---|---|---|
| 3,752,121 | 8/1973 | Brazzell | 119/1 |
| 3,965,863 | 6/1976 | Scott | 119/1 |
| 4,312,295 | 1/1982 | Harrington | 119/1 |

Primary Examiner—Gene Mancene
Assistant Examiner—R. Thomas Price
Attorney, Agent, or Firm—Sheldon H. Parker

[57] ABSTRACT

A combination of a litter device for use with cats which has a sorbent pad laminate for the collection of animal urine consisting of a bottom sheet layer of moisture impermeable material in contact with the base and walls of the litter device, an intermediate sorbent layer of material having a high absorbency capacity for urine, a top claw resistant screen and securing device. The securing device removably affixes the sorbent pad laminate to the litter device, thereby preventing the relative movement between the sorbent pad and the litter device which can be caused by the clawing action of an animal.

27 Claims, 5 Drawing Sheets

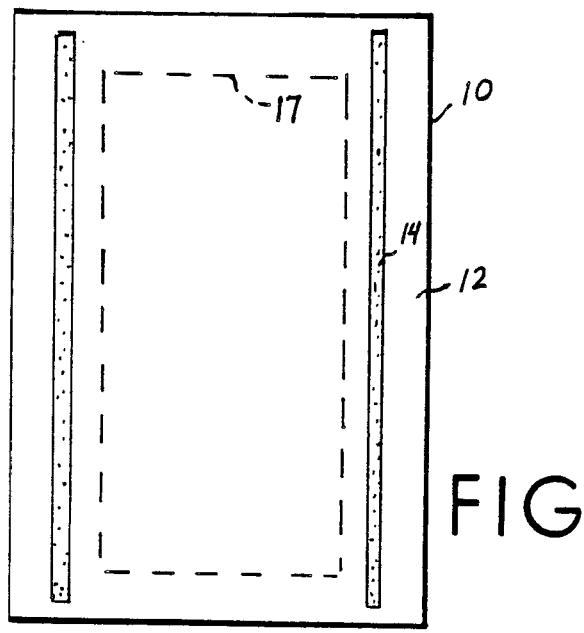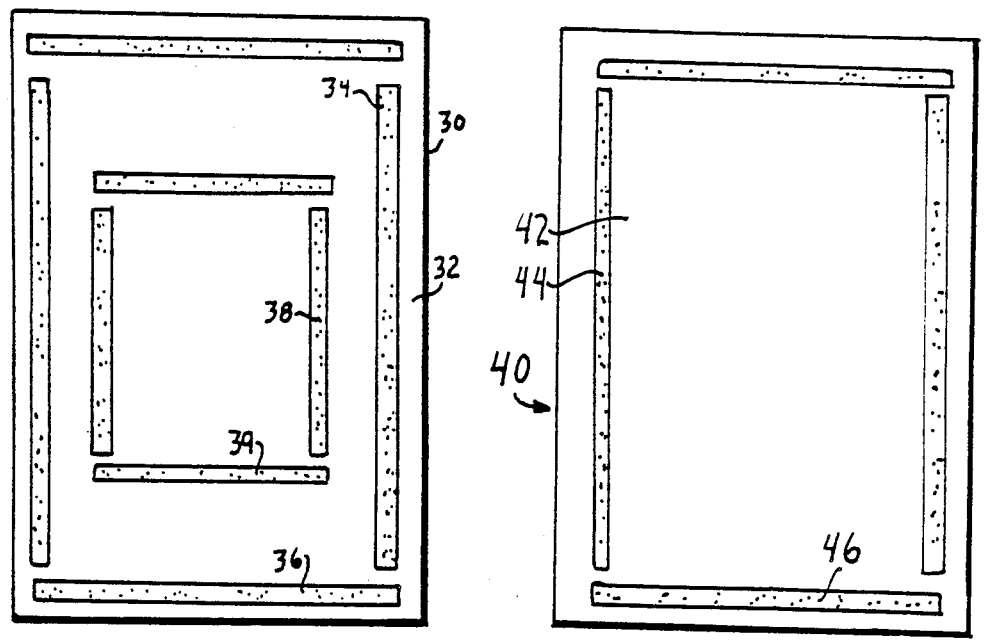

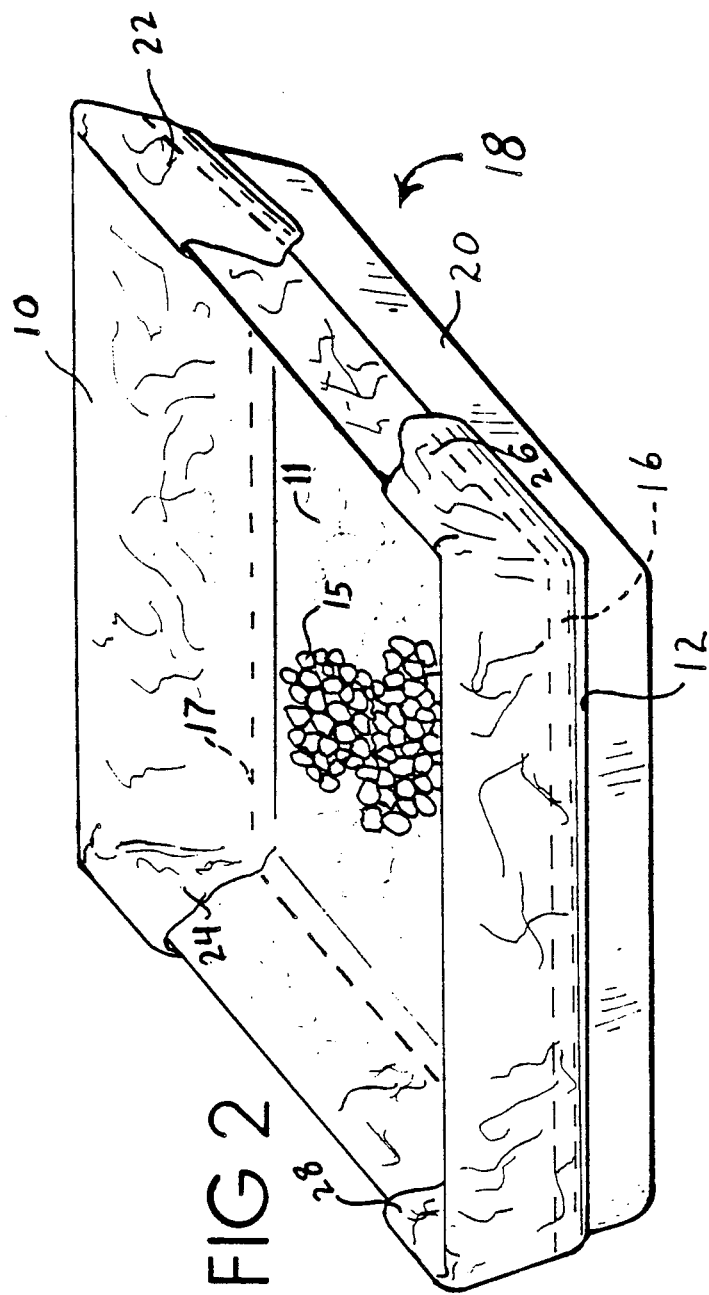

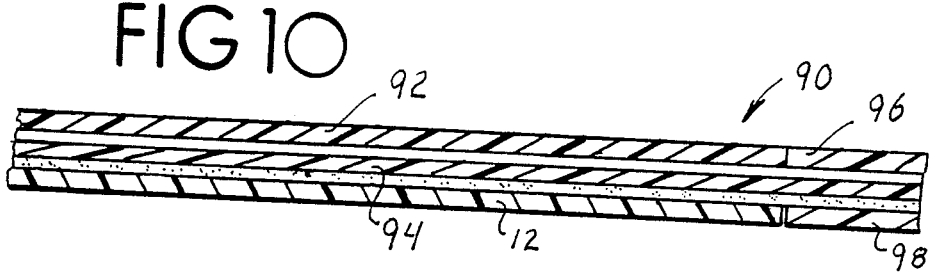
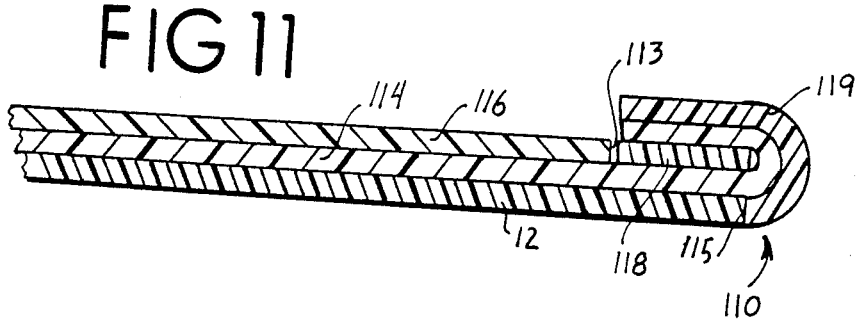
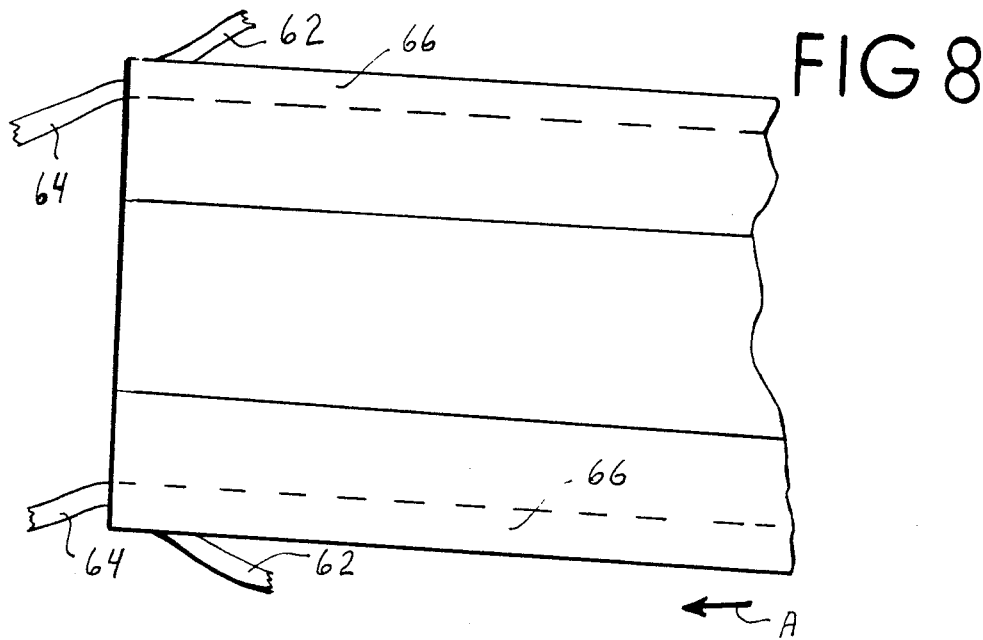

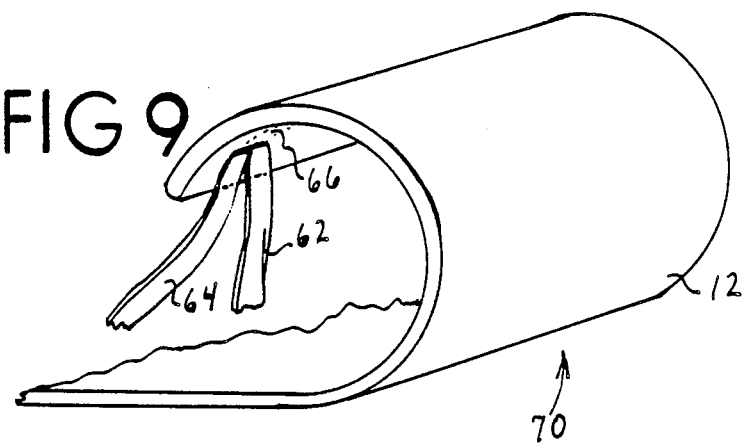
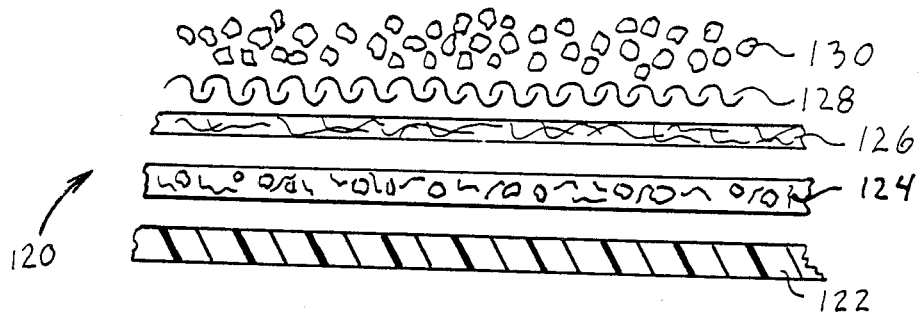
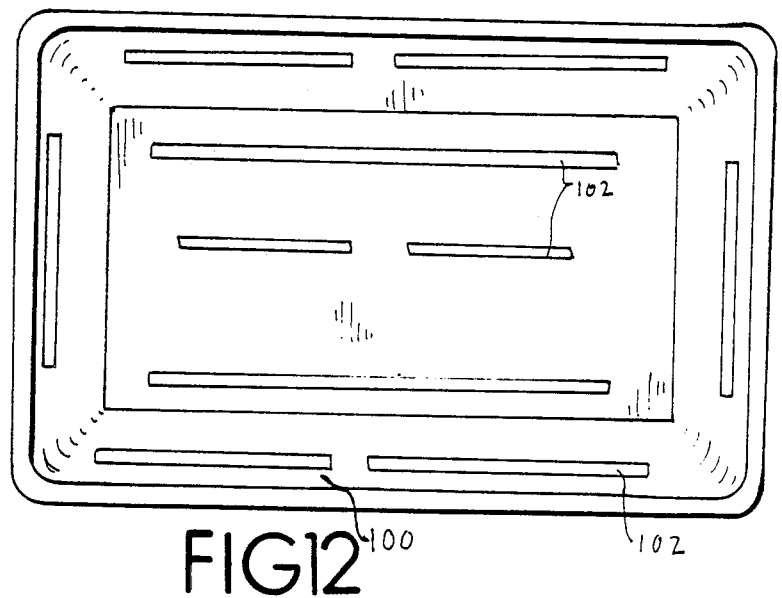

SECURING MEANS FOR ODORLESS ANIMAL LITTER UNIT

CROSS REFERENCE TO RELATED APPLICATION

This application is a continuation-in-part of application Ser. No. 573,958, filed Jan. 26, 1984, which application is a continuation-in-part of U.S. Pat. No. 4,469,046, issued Sept. 4, 1984, which application is a continuation-in-part of application Ser. No. 909,256, filed May 24, 1978, now abandoned, the subject matter and description of which is incorporated herein by reference thereto, as through set forth herein in detail.

BACKGROUND OF THE INVENTION

1. Field of the Invention

This invention relates to improvements in a unique odor preventing, disposable, absorbent pad and liner for an animal litter unit, and more particularly to an improved combination of adhesive attachment and plastic litter pad liner to be utilized in combination with an animal litter container.

2. Brief Description of the Prior Art

Many domestic animals frequently use litter boxes for the elimination of body wastes. The boxes are usually filled with various kinds of absorbent granular materials such as sand, cat litter and the like, and must be periodically emptied and cleaned, which are somewhat objectionable tasks, since the absorbent granular material must be replaced and the boxes cleaned each time.

Cats, being the most frequent users of litter boxes, present a further problem in that the urine of the feline has the most severe tendency to produce a pervasive odor problem. Apparently, cat urine contains the highest content of urea which, when allowed to stand for any length of time in any litter material, releases an ammonia odor. In any event, it is the odor associated with cat urine which is one of the more objectionable factors in the ownership of a cat.

In order to eliminate the odor caused by cat urine, the litter box must be changed frequently, this being an expensive, laborious and unpleasant job.

Many patents have issued on devices for the indoor use by cats, such as U.S. Pat. No. 3,233,588. The invention disclosed in this patent employs the use of a screen which is placed on top of the cat litter. This patent does ease the problem of animal excrement, by merely lifting the screen and disposing of the feces lying on top, it does not however, contend with the problem of the odor created by the urine. The unit must be periodically emptied of its absorbent granules and thus only partly contents with the elimination of the mess and labor involved. U.S. Pat. No. 3,809,013 is similar, except that a stack of liners is placed under the litter. When the litter becomes soiled, the liner is lifted, the litter filters through screen covered holes in the center of the liner and the litter is reused with the next liner. Again, the excrement is disposed of neatly, however the odor problem remains.

U.S. Pat. No. 3,284,273 discloses an absorbent pad which can be used in combination with animals. Although this pad does contain absorbent capabilities, the odor from the urine of the animal is trapped, much as in the standard cat litter. The pad is not designed for repetitive, long term use in a cat box but rather to retain the urine in a disposable pad, by mopping up pools of urine left on floors or in cages, etc.

U.S. Pat. No. 3,476,083 discloses the use of deodorizing substances which are placed in the bottom of the receptacle. A screen is placed a short distance above, on which lies the standard kitty litter. The upper compartment receives the solid and liquid excreta, retains the solids and absorbs the bulk of the liquid allowing the excess liquids to drain through to the lower compartment. Although providing some neutralizing of the ammonia odor by deodorizing the urine which cannot be absorbed by the litter, it does not provide an effective means for deodorizing the bulk of the urine which has been trapped in the litter. The disposal of all the litter creates a substantial expense to the owner and the cleaning of the lower compartment would be unpleasantly laborious and rather messy. The spilling of the deodorizing substances (lime is suggested) would be objectionable as well as possibly harmful to the person handling the container if by chance some of the chemical substance was to come in contact with the skin.

U.S. Pat. No. 3,752,121, Brazzell, discloses a tray which holds a absorbent mat covered with artificial grass. "Below the artificial grass 31 and its backing sheet 32 there is provided a liquid absorbing pad 33 which may be composed of a plurality of layers of absorbent paper and/or a pad of absorbent fibers to absorb any liquid which seeps through the apertures in the artificial grass backing sheet." The Brazzell patent also recommends using a deodorizer after the animal has used the unit (deodorizer included with the unit at time of purchase). The purpose of the Brazzell absorbent layer is to hold the urine, encasing it between a bottom "impervious layer" and a top "non absorbent or impervious layer" of artificial grass. The trapment of the urine allows for bacteria to grow, causing odor. This bacteria growth prevents use of the pad for long periods of time.

While many additional patents could be cited regarding other variations of disposal systems, types of granular litter and containers none of these patents overcome both the problem of odor and easy, economical and convenient disposal and replacement.

In applicant's U.S. Pat. No. 4,469,046 and pending application Ser. No. 573,958 the foregoing problems of odor, economics and convenience were overcome and an easy to use, odorless, disposable absorbent pad containing animal litter box were disclosed. The patent discloses and claims a locking means for preventing relative movement of the litter pad device and the litter box.

Since it is the pad structure which prevents the urine odor any urine trapped between the box and the moisture impermeable liner of the pad structure will cause odor. It is therefore imperative that the urine be deposited on the pad structure and that the pad remain fixed in place at all times.

SUMMARY OF THE INVENTION

It has now been found that the tendency of the sorbent pad laminate to slide when used in standard litter boxes can be eliminated without the use of the special container of the aforenoted U.S. Pat. No. 4,469,046.

In accordance with the present invention the foregoing problem is overcome by use of a pressure sensitive adhesive on the moisture impermeable liner. The liner is thus secured to a litter container. The sorbent pad prevents the odor ordinarily caused by the action of bacteria on urine in the litter container through rapid evaporation.

BRIEF DESCRIPTION OF THE DRAWINGS

The advantage and objects of the invention will become apparent and the invention will be more fully understood from the following specification, particularly when read in conjunction with the drawings, wherein:

FIG. 1 is a plan view of the litter pad unit in accordance with the present invention;

FIG. 2 is a perspective view of the litter pad unit positioned in a litter box;

FIG. 3 is a plan view of another embodiment of the moisture impermeable liner in accordance with the present invention;

FIG. 4 is a plan view of an additional embodiment of the litter pad unit in accordance with the present invention;

FIG. 8 is a fragmentary plan view of litter pad unit with the side folded in preparation for disposal;

FIG. 9 is a perspective view of an additional adhesive tape;

FIG. 10 is a perspective view of an another embodiment of the adhesive tape; and FIG. 11 is a top view of a non-custom box with an alternate taping method;

FIG. 12 is an exploded fragmentary view of the absorbent pad of the instant invention.

DETAILED DESCRIPTION OF THE INVENTION

Figure 5:
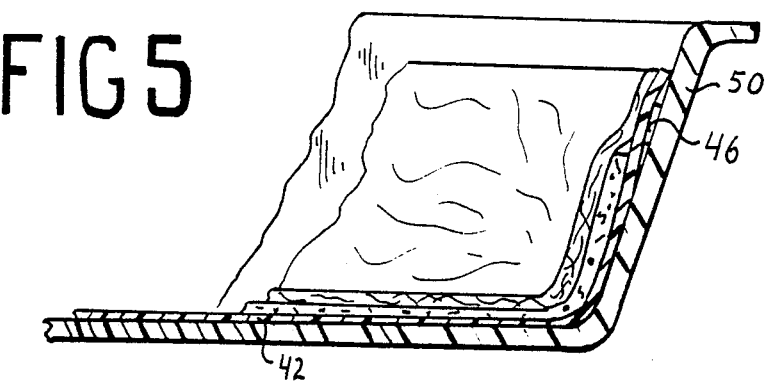
FIG. 5 is a fragmentary side view of the moisture impermeable liner of FIG. 4 placed in a litter box.

FIG. 1 illustrates the litter pad structure 10 with the impermeable liner 12, longitudinal tape 14 and the optional transverse tape 16. The longitudinal tape 14 and the transverse tape 16 are located at the peripheral edges of the impermeable liner 12 and affixed to the impermeable liner 12 by means predetermined in manufacture. There are various means for affixing the determined tape to the impermeable liner 12 that are well known in the prior art. The use pressure sensitive adhesives with absorbent pads is well known in the diaper art, as evidenced for example, by U.S. Pat. No. 4,505,706. Although the function of the adhesive means in the instant invention is unrelated the use in the diaper art, the manufacture of the adhesive is analogous and from that standpoint, the disclosure of U.S. patent is incorporated herein by reference.

The longitudinal tape 14 and the transverse tape 16 can be of the type disclosed hereinafter or of a type standard to the industry. Although reference is made herein to a tape, it should be understood that the term is intended to cover both the use of a pressure sensitive adhesive directly on the liner and a pressure sensitive adhesive carried on both sides of a carrier sheet. The only prerequisite for the tape being that the side which is in contact with the impermeable liner 12 must not be easily removable from said impermeable liner 12, while the side which will be affixed to the litter box must be readily removable. The nature of the materials to which they are being adhered will facilitate in this prerequisite as the tape will be more easily removed from the hard plastic from which litter boxes are typically made, as compared to the softer, more readily adhered to material of the plastic liner. In the event that adhesive which covers any of the tapes referred to herein and placed next to the litter box is not readily removable, the tape will tend to stick to the box and tear the impermeable liner 12 or accumulate in the bottom of the litter box. The tearing of the impermeable liner 12 will allow the interior of the litter pad structure 10 to come in contact with the bottom of the litter box, preventing evaporation of the urine, allowing for odor build up and necessitating a clean up operation.

In addition to the various tapes disclosed herein for use with the litter pads, many other means of strip adhesives as known in the art can be applied, including hot melt and cold adhesives. Double sided pressure sensitive tape with a release strip, such as commonly employed in the art can be used. The adhesive can be applied by roller, gravure head, etc. onto the bottom of the liner as it is passed over production equipment. A release film, such as waxed paper strips can then be applied over the tacky cold adhesive to prevent adhesion to undesirable surfaces.

The litter box system 18, of FIG. 2 shows the litter pad structure 10 placed in the litter box 20. In this figure, the dramatic difference between the use of a pressure sensitive adhesive in the diaper art and in association with litter pads, become evident. Prior to placement the protective strip on the longitudinal tape 16 is removed, exposing the adhesive and permitting adhesion of the horizontal tape 16 to the litter box 20. In this embodiment the bottom 11 of the litter pad structure 10 is loose and the litter pad structure 10 is only affixed to the litter box 20 at the edges. Litter granules 15 are then placed on the bottom 11 of the litter pad structure 10 to provide a cat with a medium to which it can apply a clawing action. The pressure sensitive adhesive strip 16 is shown to not merely hold the litter pad structure 10 in place, but of even greater importance, the overlying flap regions 22, 24, 26, and 28 of the litter pad structure 10, are held in place. Thus, the pressure sensitive adhesive serves to enable the litter pad structure 10 to conform to the shape and size of the litter box.

FIG. 3 illustrates an additional embodiment of the litter pad structure 30. This embodiment provides for the inner vertical tapes 38 and inner horizontal tapes 39 to be added to the outer vertical tapes 34 and outer horizontal tapes 36. The inner vertical tapes 38 and inner horizontal tapes 39 should be positioned on the impermeable liner so as to be adhered to the bottom of the litter box, this will further secure the litter pad structure 30 to the bottom of the litter box as well as around the edges. The obvious disadvantage of the additional tape would be cost of manufacture. However, the added convenience and improved holding power versus added cost of manufacture would be the primary factors in determining the amount of adhesive employed.

In FIG. 4 the small litter pad structure 40 fits the bottom of the litter box 50, leaving the sides uncovered. It is preferable that the small litter pad structure 40 be slightly larger than the bottom of the litter box 50, as shown in FIG. 5, to prevent seepage of urine between the litter box 50 and the small litter pad structure 40. The small litter pad structure 40 has the vertical tapes 44 and horizontal tapes 46 attached to the impermeable liner 42, as previously described. The addition of tapes as illustrated in FIG. 3 or any subsequent Figures can easily be incorporated with the embodiment of FIG. 4.

Figure 6:
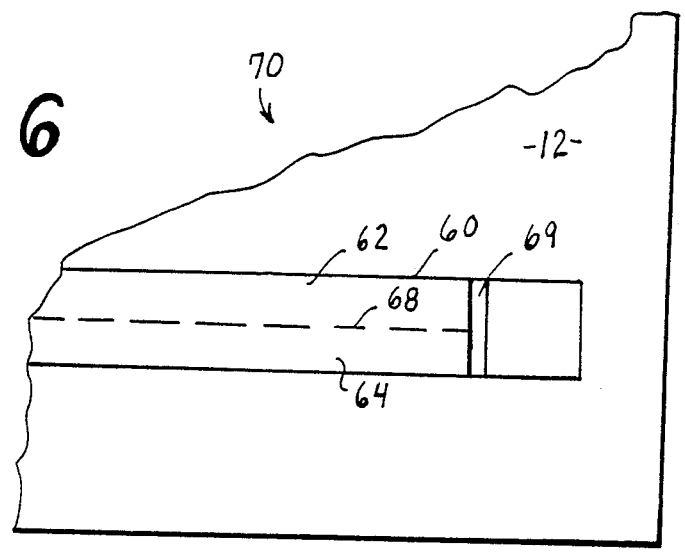
FIG. 6 is a fragmentary plan view of a tape of the instant invention.
Figure 7:
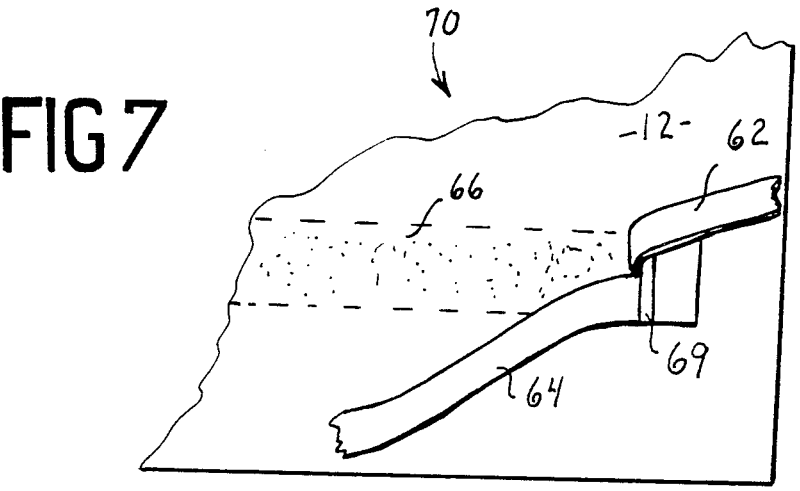
FIG. 7 is a further fragmentary plan view of the tape of FIG. 6.

FIG. 6 illustrates one type of tape to be used with most embodiments of the litter pad structure 10. The tape 60 is affixed to the impermeable liner 72 of the litter pad structure 70 as previously described. The adhesive strip 66, FIG. 7, is covered and protected from exposure by the first protective strip 62 and second protective strip 64. For use as disclosed herein it is necessary for the first protective strip 62 and second protective strip 64 to be of a tear proof flexible material, such as used for the impermeable liner 12. This heavier construction will prevent the first protective strip 62 and second protective strip 64 from tearing when used as described herein. The first protective strip 62 and second protective strip 64 are divided by the perforated line 68. The perforated line 68 allows the the first protective strip 62 and second protective strip 64 to be separated when required for tieing while allowing for one piece application at the time of manufacture. A short distance from one end of the perforated tape 60 is the peel resistant line 69. The peel resistant line 69 can be created by a heat seal, stitched area or other method convenient to manufacture in order to prevent the first protective strip 62 and second protective strip 64 from being completely removed from the tape 60. For most effective use of this embodiment, the tape 60 should be placed in from the outer edges, approximately two inches, to allow for fold over space, as described further herein. This is especially effective when used in combination with standard peel off tape for the outer horizontal and vertical strips and horizontal strips and the disclosed tape 60 for the inner vertical strips.

In FIG. 7 the first protective strip 62 and second protective strip 64 are shown lifted up and away from the tape 60 exposing the adhesive tape 66. The first protective strip 62 and second protective strip 64 can be stored under the impermeable liner 72 until the litter pad structure 70 is ready for disposal. When the litter pad structure 70 is ready for disposal, the sides are folded in, as illustrated in FIG. 8, at the line created by the adhesive strip 66, thus preventing leakage of the litter. The litter pad structure 70 is then rolled, in the direction of arrow A creating the "bed roll" effect as shown in FIG. 9. The litter pad structure 70 can then be tied by use of first protective strip 62 and second protective strip 64 for a neat and conveniently disposed of package.

FIG. 10 is an additional tape embodiment illustrating a reverse tab tape 90. The tape 90 has a double sided adhesive coated tape 94 with one of its sides adhered to the impermeable liner 12 at time of manufacture. The exposed side of the adhesive tape 94 is covered with a removable protective strip 96 to prevent its adhering to unwanted objects. In the embodiment illustrated in FIG. 10 the reverse tab tape 90 extends beyond the edge of the impermeable liner 12. The extensions section of the reverse tab tape 90 is provided with a bottom protective strip 98 and a top protective strip 96 which prevent the adhesive tape 94 from unwanted adhesion. The extension section can be folded under the impermeable liner 12 if desired, however care must be taken not to interfere with the adhesion of the adhesion tape 94 to the litter box. The litter pad structure 10 is adhered to the litter box by removal of the top protective tape 92 and exposure of the adhesive tape 94, as previously described. At time of disposal the litter pad structure 10 is folded and rolled, as described in FIGS. 8 and 9 and the bottom protective strip 98 is removed from the reverse tab tape 90 revealing the adhesive strip 94. The adhesive strip 94 is affixed to the impermeable liner 12 of the rolled litter pad structure 10, securing the structure 10 into a neat, disposable roll. Although it is preferable that the reverse tab tape 90 extend over the edge of the impermeable liner 12 to allow for easier access, it can be positioned so that the edge of the reverse tab tape 90 is flush with the edge of the impermeable liner 12. In embodiments positioning the reverse tab tape 90 flush with the edge of the impermeable liner 12, the bottom protective strip 96 is not required as the entire reverse tab tape 90 can be adhered to the litter box.

FIG. 11 is an alternate tape embodiment 110. The tape 110 is manufactured longer than the impermeable liner 12 so as to extend beyond the edge approximately two inches. The protective strip 116 covers the adhesive tape 114 only to the stop line 113. The remaining adhesive tape 114, from the edge of the protective strip 116 at stop line 113 to its end is provided with a separation strip 118. A protective strip 119 is placed on the adhesive tape 114 extending from the fold line 115 at the edge of the impermeable liner 12 to the end in order to prevent sticking of the tape 110 to the litter box. The extended tape is folded at the fold line 115 onto the unprotected adhesive strip 114, thereby placing the protective strip 118 in contact with the adhesive tape 114. The protective strip 116 covering the adhesive strip 114, until removed for use, extends only up to the edge of the folded over section of the excess tape 110. The separation strip 118 prevents the adhesive strip 114 from sticking to itself and allows for easy removal of the folded section. At time of disposal adhesive strip 114 is opened up to to extend the folded over section of the tape 110 beyond the litter pad structure 10. The litter pad structure 10 is folded and rolled as previous described in FIGS. 8 and 9. The protective strip 119 is then removed and the adhesive surface 114 exposed, allowing attachment to the impermeable liner 12 as previously described.

FIG. 12 illustrates an alternate method is which to secure the litter pad structure 10 to the litter box 100. Individual adhesive strips 102, having two adhesive sides covered by protective strips, are provided in an "unstripped" form. The first side of the protective strips can be removed, revealing the adhesive area and individual adhesive strips 102 can then be affixed at various desired positions within the box. The outer protective covering can then be removed and the litter pad structure 10 secured thereupon. This method allows for the user to secure the litter pad structure 10 to unconventional boxes or to heavily secure a cat's favorite clawing spot and is especially suited to disposable boxes. The individual tapes also save manufacturing costs in that they use less tape and the tape does not have to be previously affixed to the impermeable liner 12.

In order to provide necessary background regarding the absorbent pad of FIG. 13, the following information is provided.

GRANULAR MATERIAL 130

The granular material 130 as employed in the instant invention is utilized to satisfy the digging instinct of the animal and therefore need not provide absorptive qualities. Consequently, inexpensive materials, such as clay, can be used in accordance with individual preferences. Unlike the commonly employed systems in which the granular material 130 must be used in quantity to provide the required absorptive qualities and digging qualities, minimal quantities of the granular material can be used, as illustrated in the charts supra. The absorption quality of the layer 24 can provide the total or the predominant desiccation effect.

The litter material is commonly in granular form and must be in moisture transfer contact with the underlying absorbent material so that the urine can be drawn from the litter material into the sorptive layers. The use of a surfactant on the screen material can enhance the moisture transfer capability of the screen and is essential in combination with hydrophobic or low hydrophilicity materials.

ABSORBENT LAYER 124

The absorptive elements can be any material such as paper, tissue, pulp starch and related polymers, etc. which can disperse the liquid quickly, thus providing a large surface area for evaporation of moisture. In order to maintain a moisture free environment, it is necessary to evaporate from 5 to 20 ml. of liquid each time the system is used by the cat.

Examples of absorbent materials are those manufactured by Dow Chemical under U.S. Pat. No. 4,117,184. The Dow Chemical laminate has an indicated minimum liquid absorbency capacity of 28 grams per gram of laminate.

Alternatively, the super absorbent can be a material such as the National Starch and Chemical Corporation product sold under the registered trademark Permasorb. The National Starch product is a hydrophilic polymer which has the ability to absorb and hold urine. There is a significant reduction in urine odor and pH level in the presence of Permasorb.

Another example of an absorbent is the material sold under the trademark Water-Lock by Grain Processing Corp.

A ground paper pulp absorptive material has been found to provide a combination of high absorbency, high surface area and low cost. The large surface area provides for rapid urine evaporation and consequently is extremely effective in odor prevention.

Toxic chemicals or biologically active ingredients are not only unnecessary but preferably are avoided. U.S. Pat. No. 4,494,482 assigned to Proctor and Gamble relies on the use of 5000 to 30,000 ppm of a halogenated aromatic hydrocarbon bacteriostat in an absorbent pad to effectively control odor development. It has been found that if the sorbent material has the ability to absorb the urine, distribute the urine rapidly throughout its mass, and evaporate the urine faster than the bacteria can act on the urine, then the additives are not only unnecessary but undesirable.

Bacteria from the feces cannot grow in the absorptive layer because they are dried out and die or become dormant. It is the bacteria which is capable of breaking down the urine which cause the strong volatile odor commonly associated with cat litter boxes, the dry environment of the sorbent material effectively prevents odor. The high absorption capacity of the super absorbent polymers, such as available from Dow Chemical, do not provide an advantage over a pulp fiber, due to the high rate of evaporation of urine from the fiberous material. As previously stated, the instant invention requires substantially less granular material for each use and requires fewer changes, saving further on granular use. Whereas, in conventional litter systems two to three inches of litter are required, in accordance with the present invention less than one inch of litter, and preferably no more than about one half inch, provides the desired results.

SCREEN MATERIALS

A flexible, screen like mesh or permeable or semi-permeable membrane is utilized to prevent the animal from clawing through to the absorbent layer. The screen material 128 must, therefore, exhibit sufficient strength to with stand the clawing action of the animal. Even though the screen is disposable, it is critical that the screen be made of a material which is relatively inert to urine thereby preventing rapid corrosion of the screen material, resultant odors and chemical activity. Some of the preferred materials of construction include polyester and polypropylene. Particularly in the case of hydrophobic materials, a surfactant must be used to prevent the screen from acting as a liquid transfer barrier. While the particular surfactant which is used is not narrowly critical, by way of illustration the surfactant can be a non-ionic surfactant such as Tergitol. The mesh-like screen or netting 128 can be formed by the spun bonding process as well known in the art. While it would appear that screens formed by this process would not be capable of providing the required claw rip resistance without resorting to such a high material density that moisture transfer would be either precluded or severely restricted and cost would be excessive, it has been found that a critical balance of properties can be achieved. The absorptive layer must be protected from the tearing action of the claws. For example, the screen of Vander Wall, U.S. Pat. No. 3,476,083, would be totally inoperative to prevent tearing of the absorptive layer or the plastic moisture barrier.

The use of a loose screen-like fabric is unacceptable because the mesh can be varied as a result of the force of the animal's claws. Accordingly, the reference to mesh size is intended to indicate the effective size under actual use conditions rather than a 'temporary' size which can be readily altered by the animal.

The screen used in the instant invention requires a high abrasion resistance to avoid the fabric from pilling or wearing thin in certain sections. The criteria of the bursting strength and tear strength are important to prevent ripping. The pressure exerted by an animal, especially by a cat, can put stress on the fabric in diagonal, horizontal and vertical directions simultaneously. If the protective screen is torn, the animal has access to the urine filled absorbent layer. The absorbent layer must be allowed to dry out and the bacteria should be aerated to the maximum extent. Thus, the air permeability of the fabric is critical as air is required to prevent the accumulation of liquid urine and its odor, through evaporation and the maintenance of an aerobic environment. The liquid repellency of the fabric allows all the urine to pass through the fabric onto the absorbent layer and prevents the urine from being absorbed into the fabric. The chemical and bacteria, etc. repellency of the fabric prevents the corrosion of the fabric by the urine as well as bacteria build-up within the fabrics.

FIG. 13 shows, in exploded form, a cross-section of the layers which form the absorbent unit 120. The outer layer 122 which is a thin plastic sheet of a material such as polypropylene or polyethylene prevents waste from making contact with the box and doubles as a bag when disposing of the soiled litter. The sorbent layer 124 is formed from a super absorbent material as previous stated herein.

The protective layer 126 is made from a durable, non-woven tissue substance. If a binder is used for either the fabric of the tissue layer or other layer, it must be of a non-water soluble material. The protective screen 128 is of a flexible, durable substance which prevents the animal from scratching through to the bottom layers. The granular material 130 is placed on top of the absorbent unit as previously described herein.

The foregoing description of adhesive strip placement, quantities and lengths have been used herein as examples for illustration purposes and in no way limit the scope of the invention. Any combination of placement, quantity and length of any double sided adhesive tape can be incorporated in the instant invention and to describe all combinations would be too lengthy. Additionally, the instant invention can be combined with any of the co-pending applications, i.e. disposable bag, non-woven screen and/or disposable carton.

What is claimed is:

1. In the combination of a litter box and a litter device for use with cats,
   said litter box having a base and four walls,
   said litter device being a sorbent pad laminate means for the collection of animal urine and comprising:
   (a) a bottom sheet layer of moisture impermeable material, and sheet layer being in contact with the base and walls of said litter device;
   (b) an intermediate sorbent layer of material having high urine dispersion and sorbency capacity;
   (c) a top claw resistant screen means, said screen means being a urine permeable, urine inert, flexible member formed of strands having sufficient tear strength to withstand the clawing action of a cat and sufficiently small hole size to protect said sorbent layer and said sheet layer of moisture impermeable material from being torn by animal claws,
   said bottom sheet layer and said top screen means being secured to each other along at least a substantial portion of their periphery;
   the improvement comprising: securing means, said securing means removably affixing said sheet layer to said base of said litter device and preventing relative movement between said litter box and said litter device which can be caused by the clawing action of an animal.

2. The combination of claim 1, wherein said securing means is a pressure sensitive adhesive means.

3. The combination of claim 2, wherein said adhesive means comprises strips of tape coated with a pressure sensitive adhesive substance on both sides.

4. The combination of claim 2, wherein said securing means is proximate the periphery of at least two parallel sides of said sheet layer of moisture impermeable material.

5. The combination of claim 2, wherein said securing means is at least two spaced lengths of pressure sensitive adhesive parallel to two opposite sides of said sheet layer of moisture impermeable material.

6. The combination of claim 4, further comprising a second set of parallel securing means affixed to said sheet layer of moisture impermeable material.

7. The combination of claim 1, wherein said securing means is a tape a first adhesive side and a second adhesive side,
   said first adhesive side having a first end and a second end and being covered by a tear proof protective covering, said protective covering having a longitudinal perforated line extending from said first end to a point proximate said second end, said perforated line longitudinally dividing said protective covering in approximately two equal sections;
   peel resistant means at said point proximate said second end, said peel resistant means preventing removal of said tear proof protective covering between said point proximate said second end and said second end;
   said second adhesive side being affixed to said sheet layer of moisture impermeable material.

8. The combination of claim 1, wherein said securing means is a tape having a first and a second end, a first adhesive side and a second adhesive side,
   said first adhesive side having a first removable protective covering from said first end of said tape to a first point proximate said second end of said tape and a second removable protective covering from said first point to said second end of said first adhesive side of said tape;
   said second adhesive side being affixed to said sheet layer of moisture impermeable material from said first end of said tape to a second point proximate said second end of said adhesive tape, said second point being positioned from said second end at an equal distanced to said first point, and a removable protective covering from said second point of said second side to said second end of said second adhesive side.

9. The combination of claim 8 wherein said tape extends beyond said combination substantially equal to the distance from said first point to said second end of said tape.

10. The combination of claim 1, wherein said securing means is tape, said tape having a length greater than said sorbent pad laminate and having a first adhesive side and a second adhesive side,
    said first adhesive side having
      a first part, said first part having a removable protective covering from the first end of said tape to a first point proximate the second end of said tape
      a second part, extending from said first point to a second point between said first point and said second end of said tape, and
      a third part, said third part having a removable protective covering and extending from said second point to said second end of said tape;
    said second adhesive side having
      a first part, said first part being affixed to said sheet layer of moisture impermeable material from the first end of said tape to a third point, said first part of said second side being equal to said first part and said second part of said first adhesive side,
      a second part having a removable protective covering extending from said third point of said second adhesive side to the second end of said tape;
    whereby said third part of said first adhesive side is folded over onto said second part of said first adhesive side.

11. The combination of claim 1 wherein said litter box is a self supporting structure.

12. The combination means of claim 11, wherein said sorbent pad laminate means overlies the outer walls of said litter box and said securing means secures said laminate means to at least a portion of said outer walls of said litter box.

13. The combination means of claim 12, wherein said sorbent pad laminate means is folded over itself in the region at which it secures said laminate means to at least a portion said outer walls.

14. The combination of claim 11, wherein
  (a) said securing means secures said laminate means to at least a portion of said walls of said litter box and
  (b) said sorbent pad laminate means overlies the walls of said litter box and
    (1) is folded over itself and
    (2) is secured to itself by said securing means.

15. The combination means of claim 1, further comprising litter granules, said litter granules overlying said top claw resistant screen means.

16. The combination means of claim 15, wherein said litter granules are substantially nonabsorbent to urine.

17. The combination of claim 1, wherein said sheet layer of moisture impermeable material has length and width dimensions at least equal to that of said screen means, said screen means being sealed to moisture impermeable material along at least a substantial portion of their peripheral edges, said screen means being a flexible member formed of strands bonded at their intersections and formed of a material which is substantially inert to urine.

18. The combination means of claim 17, wherein said securing means secures said sorbent pad laminate means to the outer surface of said walls of said litter box.

19. The method of removing and securing for disposal a sorbent pad laminate means, and the litter thereon, used for the collection of animal urine, from a litter device walls and a base, said sorbent pad laminate means and litter including:
  (a) a bottom sheet layer of moisture impermeable material, said sheet layer being in contact with said base and walls of said litter device, said sheet layer of moisture impermeable material having a first edge, a second edge, a third edge and a fourth edge;
  (b) an intermediate sorbent layer of material having a high absorbency capacity for urine,
  (c) top claw resistant screen means, and
  (d) securing means, said securing means removably affixing said sorbent pad laminate means to said litter device and preventing relative movement between said sorbent pad and said litter device which can be caused by the clawing action of an animal, with at least part said securing means being parallel to said second edge and said fourth edge;
  (e) litter, said litter granules overlying said top claw resistant screen means;
comprising the steps of:
  (a) removing said sheet layer of moisture impermeable material from contact with said walls and said base of said litter device by removing said securing means from said walls and said base;
  (b) folding said second edge and said fourth edge of said sheet layer so as to overlie said claw resistant screen means;
  (c) rolling or folding said third edge of said sheet layer in the direction of said first edge of said sheet layer, causing said litter to be between said folded third and first edges of said sheet layer and said top claw resistant screen;
  (d) fastening said rolled sheet layer of moisture impermeable material with fastening means.

20. The method of claim 19, wherein said securing means is a tape having a first adhesive side and a second adhesive side said first adhesive side having a first end and a second end, said second end being proximate said first edge of said moisture impermeable sheet layer, said first adhesive side being covered by a removable tear proof protective covering, said protective covering having a perforated line down its length from said first end to a point proximate the end of said second end;
peel resistant means at said point proximate said second end, said peel resistant means preventing removal of said tear proof protective covering between said point proximate said second end and said second end;
  said second adhesive side begin affixed to said sheet layer of moisture impermeable material; comprising the steps of
    (a) removing said tear resistant protective covering from said tape and separating said tear resistant protective covering at said perforated line forming two tear resistant strips,
    (b) tying said rolled or folded sorbent pad laminate in said rolled or said folded position using said two tear resistant strips.

21. The method of claim 19, wherein said securing means is a tape having a length greater than that of said sorbent pad laminate and having
  a first end and a second end, said second end being proximate said first edge of said moisture impermeable sheet layer,
  a first adhesive side and a second adhesive side; said first adhesive side having a first removable protective covering from said first end of said tape to a first point proximate said second end of said tape and a second removable protective covering from said first point to said second end of said first adhesive side of said tape;
  said second adhesive side being affixed to said sheet layer of moisture impermeable material from said first end of said tape to a first point proximate said second end of said adhesive tape opposite said first point of said first adhesive side, and a removable protective covering from said first point of said second adhesive side to said second end of said second adhesive side and extending beyond said sorbent pad laminate a distance equal to the distance from said first point to said second end;
  wherein the method of fastening said sorbent pad laminate comprises the steps of
    (a) removing said removable protective covering from said first point of said second side to said second end of of said second side exposing said adhesive
    (b) securing said exposed adhesive to said rolled or folded sheet layer of moisture impermeable material.

22. The method of claim 21, wherein said securing means is tape, said tape having a length greater than said sorbent pad laminate and having a first adhesive side and a second adhesive side,
  said first adhesive side having
    a first part, said first part having a removable protective covering from the first end of said tape to a first point proximate the second end of said tape
    a second part, said second part having a protective covering and extending from said first point to a second point between said first point and said second end of said tape, and a third part, said third part extending from said second point to the second end of said tape;

said second adhesive side having a first part, said first part being affixed to said sheet layer of moisture impermeable material from the first end of said tape to a first point, said first point being equal to the combination of said first part and said second part of said first adhesive side, a second part having a removable protective covering extending from said first point to said second adhesive side to the second end of said tape;

whereby said third part of said first adhesive side is folded over onto said second part of said first adhesive side, said tape being positioned between said sheet layer of moisture impermeable material and said container;

wherein the method of fastening said sorbent pad laminate comprises the steps of (a) unfolding said third part of said first adhesive side (b) removing said protective covering from said second part of said second side revealing said adhesive tape and (c) securing said rolled or folded sheet layer of moisture impermeable material with said exposed adhesive tape.

23. The method of securing a sorbent pad laminate means to a litter box, said sorbent pad laminate means and litter including:

(a) a sheet layer of moisture impermeable material, said sheet layer being in contact with said base and walls of said self supporting structure, said sheet layer of moisture impermeable material having a first side, a second side, a third side and a fourth side;

(b) a sorbent layer of material having a high absorbency capacity for urine, said sorbent layer being in contact with said sheet layer (c) claw resistant screen means on the side of said sorbent layer opposite said sheet layer of moisture impermeable material, said screen means being a flexible member formed of strands fused at their intersections and is of a material which is substantially inert to urine (d) securing means, said securing means removably affixing said sorbent pad laminate means to said self supporting container and preventing relative movement between said sorbent pad and said self supporting structure which can be caused by the clawing action of an animal;

said sorbent pad laminate being used for the collection of animal urine.

said litter box being a self supporting structure having a base and four walls, comprising the steps of;

(a) removing the protective coverings from said securing means (b) placing said securing means in contact with said base of said self supporting structure, causing said sheet layer of moisture impermeable material to be in flat contact with said base, (c) pressing said securing means in contact with said base and said wall of said self supporting structure, causing said sheet layer of moisture impermeable material to be in flat contact with said base (d) folding said sorbent pad laminate means over itself in the region where said sorbent pad laminate means overlies said walls.

24. The method of claim 23, wherein said adhesive means is strips of adhesive tape protected on a first side by a removable protective covering and adhered on a second side to said sheet layer of moisture impermeable material comprising the steps of (a) removing the protective covering of a first set of said tape means, the second sides of which are affixed proximate the periphery of said impermeable member (b) removing the protective covering of a second set of adhesive means, the second sides of which are affixed proximate the center of said sheet layer of moisture impermeable member.

25. The method of claim 24, wherein said securing means is a tape having a first adhesive side and a second adhesive side said first adhesive side having a first end and a second end, said first adhesive side being covered by a removable tear proof protective covering, said protective covering having a perforated line down its length from said first end to a point proximate the end of said second end;

peel resistant means at said point proximate said second end, said peel resistant means preventing removal of said tear proof protective covering between said point proximate said second end and said second end;

said second adhesive side being affixed to said sheet layer of moisture impermeable material;

whereby said tear resistant protective covering is separated at said perforated line on said peel resistant means thereby creating two lengths of tear proof material.

26. The method of claim 25 wherein said adhesive means is a tape having length greater than that of said sorbent pad laminate and having a first end and a second end, a first adhesive side and a second adhesive side, said first adhesive side having a first removable protective covering from said first end of said tape to a first point proximate said second end of said tape and a second removable protective covering from said first point to said second end of said first adhesive side of said tape;

said second adhesive side being affixed to said sheet layer of moisture impermeable material from said first end of said tape to a first point proximate said second end of said adhesive tape opposite said first point of said first adhesive side, and a removable protective covering from said first point of said second side to said second end of said second adhesive side and extending beyond said sorbent pad laminate the dimension from said first point to said second end.

27. The method of claim 26, wherein said securing means is a tape, said tape having a length greater than said sorbent pad laminate and having a first adhesive side and a second adhesive side, said first adhesive side having a first part, said first part having a removable protective covering from the first end of said tape to a first point proximate the second end of said tape a second part, said second part having a protective covering and extending from said first point to a second point between said first point and said second end of said tape, and a third part, said third part extending from said second point to the second end of said tape;

said second adhesive side having a first part, said first part being affixed to said sheet layer of moisture impermeable material from the first end of said tape to a first point, said first point being equal to said first part and said second part of said first adhesive side, a second part having a removable protective covering extending from said first point of said second adhesive side to the second end of said tape;

said third part of said first adhesive side being folded over onto said second part of said first adhesive side and said tape being positioned between said sheet layer of moisture impermeable material and said container.

* * * * *